United States Patent

Totsuka et al.

[11] Patent Number: 5,303,081
[45] Date of Patent: Apr. 12, 1994

[54] LASER BEAM SCANNER

[75] Inventors: Kazuhiro Totsuka; Akio Asai; Hideki Kamogawa, all of Aichi; Masao Kishi, Osaka, all of Japan

[73] Assignees: Sumitomo Electric Industries, Ltd., Osaka; Toyota Jidosha Kabushiki Kaisha, Toyota, both of Japan

[21] Appl. No.: 60,009

[22] Filed: May 12, 1993

[30] Foreign Application Priority Data

May 15, 1992 [JP] Japan ................. 4-148822

[51] Int. Cl.$^5$ ............................. G02B 26/08
[52] U.S. Cl. ..................... 359/213; 359/221; 359/845; 219/121.13; 219/121.33; 219/121.74
[58] Field of Search ............... 359/213, 214, 221, 845, 359/848, 853; 219/121.13, 121.33, 121.74, 121.78, 121.84

[56] References Cited

U.S. PATENT DOCUMENTS

| | | | |
|---|---|---|---|
| 4,253,739 | 3/1981 | Carlson | 359/845 |
| 4,400,609 | 8/1983 | Pastushenko et al. | 219/121.13 |
| 4,721,376 | 1/1988 | Fushchetto | 359/845 |
| 4,772,110 | 9/1988 | Roszhart | 359/845 |
| 5,094,519 | 3/1992 | Ealey et al. | 359/845 |
| 5,148,326 | 9/1992 | Hohberg | 359/853 |
| 5,172,277 | 12/1992 | Wahl et al. | 359/845 |
| 5,208,439 | 5/1993 | Arai | 219/121.74 |
| 5,237,150 | 8/1993 | Karube | 219/121.74 |

FOREIGN PATENT DOCUMENTS 5737589 8/1980 Japan .
61-292122 12/1986 Japan .
3-243292 10/1991 Japan .

OTHER PUBLICATIONS

Hirosaki et al, "Application of Beam Scanner to Laser Welding", Japanese Society of High Temperature, vol. 15, No. 6, p. 286 (1989).

Primary Examiner—Loha Ben
Attorney, Agent, or Firm—Cushman, Darby & Cushman

[57] ABSTRACT

It is profitable to oscillate a beam on objects when a high power $CO_2$ laser beam or a high power YAG laser beam welds or anneals the objects. In order to let a laser beam scan, a device for reciprocating a lens or a device for rotating two mirrors synchronously has been proposed. These devices suffer from the difficulty of cooling. Prior devices are not applicable to a high power laser. A parallel laser beam is first reflected by a parabolic mirror. Then a mirror which is reciprocally swaying by a galvanometer reflects the beam toward the objects. A water inlet and an outlet are mounted on a rear surface of the swaying mirror. Cooling water is carried out through coiled tubes. Excellent heat diffusion prevents the galvanometer from malfunction.

5 Claims, 7 Drawing Sheets no scanning spinning scanning

LASER BEAM SCANNER

FIELD OF THE INVENTION

This application claims the priority of Japanese Patent Application No. 148822/1992 filed May 15, 1992, which is incorporated herein by reference.

This invention relates to an apparatus for letting a $CO_2$ laser beam or a YAG laser beam scan right and left on an object when the object is treated by the heat of the laser beam. A high power $CO_2$ or high power YAG laser is utilized to various treatments, e.g. welding of metals, annealing or cutting of objects, because the $CO_2$ laser or the YAG laser can heat objects strongly by a focused beam.

A case of welding by laser beams will now be explained. In FIG. 9, two objects (13) and (13) shall be welded together by a beam of a $CO_2$ laser or a YAG laser. A first mode of beam motion is a static mode in which the beam is relatively moved along a butting line as shown in FIG. 9(a). In reality, the laser beam is fixed, but the objects are transferred along the butting line. Since the laser beam does not move and the focused beam heats locally a narrow region on the butting line, the depth of molten portion of the objects becomes deeper than any other modes. Deep melting of the objects enables the static beam mode to weld two objects quickly with little deformation. Furthermore, the statics beam mode dispenses with complex optics for guiding the laser beam from the laser to the objects. Simple optics is another advantage of the static beam mode.

However, the static beam mode is accompanied by the following drawbacks, because it uses a narrow, focused, static beam:

① the beam is likely to deviate the butting line in the case of butting welding (sides of objects are welded together); and ② the strength of welding is likely to be too weak in the case of overlapping welding (side parts of surfaces are overlapped and welded up and down).

In order to overcome the drawbacks, a spinning of a laser beam (a spinning mode) and a scanning mode of a laser beam have been proposed so far.

FIG. 9(b) demonstrates the motion of a spinning mode in which a laser beam depicts a continual spinning locus along a butting line of the objects. FIG. 9(c) shows the motion of a scanning mode in which a laser beam depicts a sawmark-like wave locus. In any cases, the objects are transferred along a butting line. Thus, the spinning mode requires the laser optics to spin the beam. The scanning mode is accomplished by oscillating the laser beam right and left. Oscillation or rotation of mirrors or lenses accompanies the spinning mode or the scanning mode. This invention adopts the scanning mode and proposes an improvement thereof.

BACKGROUND OF THE INVENTION

FIG. 10 exhibits a basic structure of an optics of a $CO_2$ laser for letting a beam scan on objects. The structure has proposed, e.g. by Japanese Patent Laid Open No. 61-292122. Any laser optics which guides a beam from a laser to an object is provided with two mirrors even in the case of static mode. In the static mode, the mirrors are fixed. In the case of a spinning mode, two mirrors (32) and (32') are synchronously rotated around axes (33) and (34). The angular velocities and the phases of the mirrors are in a special relation. It seems miraculous that the rotations of the mirrors allow the beam to oscillate right and left without rotation. But the conversion from the rotations to the oscillation is surely realized by the way described by the cited Japanese Patent Laid Open No. 61-292122. The apparatus enjoys an advantage of small load upon a driving device because of small inertia of the mirrors. However, the apparatus suffers from a drawback that two mirrors must be rotated synchronously. Furthermore, it is difficult to cool the mirrors by circulating cooling water in mirror holders, because the mirrors are fully rotating.

FIG. 11 demonstrates another related art for letting a laser beam scan on objects. Slide bearings are omitted in the figure for simplicity. A link (38) and a lens holder (41) are supported by slide bearings which allow them to slide left and right. A motor (35) rotates an eccentric cam (36) connected via a bearing to a crank (37). The crank (37) is connected to a link (38) at the other end with a pin (39). The link (38) is combined by another pin (40) with a lens holder (41) supporting a lens (42). Eccentricity of the cam (36) converges the rotation into an oscillation of the crank (37) and the link (38) right and left. Thus, the lens (42) oscillates right and left repeatedly. A laser beam (5) which has been a parallel beam between points B and C and points R and S is converged by the lens (42) on the objects (13) and (13) near a butting line (15). When the lens (42) moves reciprocally left and right, the focused beam also moves reciprocally. Such a scanning device has been explained by, e.g. Hirosaki et al., "Application of a beam scanner to laser welding", Japanese Society of High Temperature vol.15, No.6, p 286 (1989).

This lens type scanner has an advantage that the driving apparatus is simpler than the double-mirror scanner already described. However, the lens type scanner is annoyed by drawbacks. A heavy lens induces an increase of the motor load. A stain of the lens incurs increment of absorption of infrared light and generates a large amount of heat. The heat expands the lens. Dilation of the lens deviates the focus of beams from the determined point on the objects. This phenomenon is called "thermal lens effect". A fatal weak point is incapability of cooling, because the lens cannot be cooled by circulating water in an inner cavity perforated in the lens. Applicable cooling is only either circulating water in a cavity of a lens holder or blowing wind on the lens itself. Namely, direct water cooling is forbidden to the lens type scanner. Only indirect water cooling or wind cooling is available.

Besides the double-mirror scanner and the lens type scanner, an oscillating mirror type scanner has been proposed. A galvanometer rotates a mirror reciprocatively within a small amplitude. A galvanometer was originally a sensor for detecting a current which is provided with a permanent magnet, a coil and a rotor. If a current is supplied into the coil, the rotor rotates in proportion to the current. Application of an alternate current will rotate the rotor clockwise and counterclockwise. This is a usage of a galvanometer not as a sensor but as a driver. There are already some scanning devices making use of a galvanometer. However, such a scanner driven by the galvanometer is suitable for only a small-power laser, but it is not suitable for a wide-power laser, which emits a wide bean more than 1 kW in power.

When the diameter of a beam is large, the mirror must be wide. A wide mirror will increase the load of the galvanometer, because of the heavy weight. When the laser output power is high, heat generation at the mirrors increases drastically. A large amount of heat transmits from the mirror via a mirror shaft to the galvanometer. Shafts or bearings of the galvanometer expand thermally. Thermal expansion of the shafts or bearings will heighten the resistance against rotation.

When a ferromagnetic material is heated, the permeability decreases. Thus, the electromagnets in the galvanometer lose the magnetic power when they are heated. By these reasons, strong heat generation on the mirror is likely to kill the oscillation motion of the mirror. Forced cooling would remove the inconvenience incurred by the heat generation. However, it is difficult to cool the mirror by circulating cool water in an inner space of the mirror, since the mirror is rotating reciprocally with a high frequency. Thus, the mirror is cooled by blowing wind on the surface thereof.

The problem of the prior invention relates to a beam scanning device of an optics of a $CO_2$ laser or a YAG-laser with output power more than 3 kW for welding, cutting or annealing. The beam diameter is wide. The optics of the laser must treat with a wide, strong beam. A lens type scanner would be heavy and bulky as a whole, because of the wide lens. The sliding portions, i.e. a lens, a lens holder, a crank device, etc. would also become heavy. Big load would impose upon a motor. Strong friction force would abrade the sliding portions. The crank mechanism would invite loud noise. Ordinary glass lens cannot be used in the scanning device, since ordinary glass absorbs infrared light of a $CO_2$ laser. Even if a ZnSe lens would be employed to the converging lens, more than 0.4% of light power would be absorbed by the ZnSe lens. The large power more than 3 kW would induce a large dilation of lens accompanied by a big thermal lens effect. Furthermore, a lens cannot be fully cooled by the structural restriction.

The reciprocal mirror type scanner which oscillates reciprocally a mirror by a galvanometer has been employed for a small power laser. Application of the reciprocal mirror type scanner to a high power laser will require more complete cooling. Otherwise the heat yielded at the mirror is conducted to the shafts and the bearing of the galvanometer and the expanded shafts and bearing will stop the reciprocal motion.

The purpose of this invention is to provide a device for letting a laser beam scan enough even for high power laser more than 3 kW emitting a wide beam larger than 50 mm $\phi$ in diameter.

SUMMARY OF THE INVENTION

The laser beam scanner of this invention comprises a parabolic mirror for reflecting and converging a parallel, wide laser beam, a reciprocally swaying mirror for reflecting the converged beam, a galvanometer for oscillating the swaying mirror and a cooling device for cooling the swaying mirror by circulating water in an inner space of the swaying mirror.

Cooling of the swaying mirror by water is one of the characteristics of this invention. In order to cool effectively the swaying mirror, the mirror is fixed to a cooling plate with an inner space for water. An inlet and an outlet of cooling water are perforated at middle regions of the rear surface of the cooling plate. Water is introduced into the inner space through the inlet and is exhausted from the inner space through the outlet. Water tubes are jointed to the inlet and the outlet to supply water or to exhale water from the cooling plate. The water tubes are coiled so as to deform easily. The material of the coiled water tubes is preferably urethane, because urethane excels in elasticity and the elasticity is little changed by the change of temperature. The shape (coil) and the material (urethane) of the water tubes hardly disturb the swaying motion of the mirror. The axial line of the parabolic mirror is settled to be parallel with the incident laser beam. Furthermore, the objects shall be positioned at a focus of the parabolic mirror. The swaying mirror shall preferably be made from silicon (Si), because Si is a light material.

Functions of the laser beam scanner of this invention will now be explained. The laser beam scanner comprises a parabolic mirror, a swaying mirror, a galvanometer and a cooling device. A laser beam is twice reflected by the parabolic mirror and the swaying mirror, and irradiates objects. The galvanometer oscillates the swaying mirror reciprocally in angular direction with some amplitude. The cooling device cools the swaying mirror with water. The parabolic mirror is a static mirror fixed by some supporter (not shown in figures). The laser beam with a large diameter is slightly converged by the first parabolic mirror. Owing to the convergence of the first mirror, the diameter of the beam slightly diminishes at the second swaying mirror. Diminution of the beam enables us to curtail the diameter of the second mirror. The decrease of the diameter results in small weight and small inertia momentum of the mirror. The small inertia momentum of the mirror alleviates the load of the galvanometer.

The swaying mirror can sufficiently be cooled directly by the water circulating in an inner space of the cooling plate. The water inlet and water outlet are scarcely perturbed by the swaying motion of the mirror, because the water inlet and water outlet are positioned at middle regions on the rear surface of the cooling plate. Therefore, the coiled water tubes hardly hinder the swaying motion of the cooling plate. Completeness of cooling allows the converging optics to be adopted as a beam scanner for a high power laser.

Otherwise the positions of the parabolic mirror and the swaying mirror can be exchanged. In the structure, the laser beam is swayed at first and is converged. But in the structure, the laser beam is swayed at first and is converged. But in the version, the swaying motion of the first mirror will incur the change of incident angle of the beam to the parabolic mirror. The shape of the beam at a focus deforms according to the change of the angle. Thus, the reverse version may not achieve an appropriate performance for welding or annealing.

Advantages of this invention will now be explained. This invention allows a $CO_2$ laser or a YAG laser apparatus to let a laser beam scan right and left for welding or annealing. Since the heated region is enlarged by scanning, the problem of deviation of a beam from a butting line is solved in the case of butting welding. The welding force at the overlapped joint line is enhanced in the case of the overlapping welding, because the heated, melted region is widened.

The device of the invention sways a mirror in order to let a laser beam scan. However, since a galvanometer is used to oscillate the mirror in a small angle, the reciprocal motion generates little noise or vibration. This is because the galvanometer can produce a reciprocal motion by electromagnetic function without a mechanical assembly which would cause noise or vibration.

High power laser beam yields heat at a mirror by small absorption for infrared light. If the heat were transmitted from the mirror to the galvanometer, the heat would degenerate the mechanical performance and magnetic property of the galvanometer. However, the apparatus of this invention cools effectively the swaying mirror by circulating water in an inner space of the mirror. Efficient cooling protects the galvanometer from the damage due to high temperature. The galvanometer can continually work well without the degeneration of performance. The inlet and the outlet of cooling water are built at middle regions on the rear surface of the cooling plate. The water tubes communicating with the inlet and the outlet don't disturb the reciprocal swaying motion of the mirror.

DETAILED DESCRIPTION OF THE PREFERRED EMBODIMENTS

Figure 1:
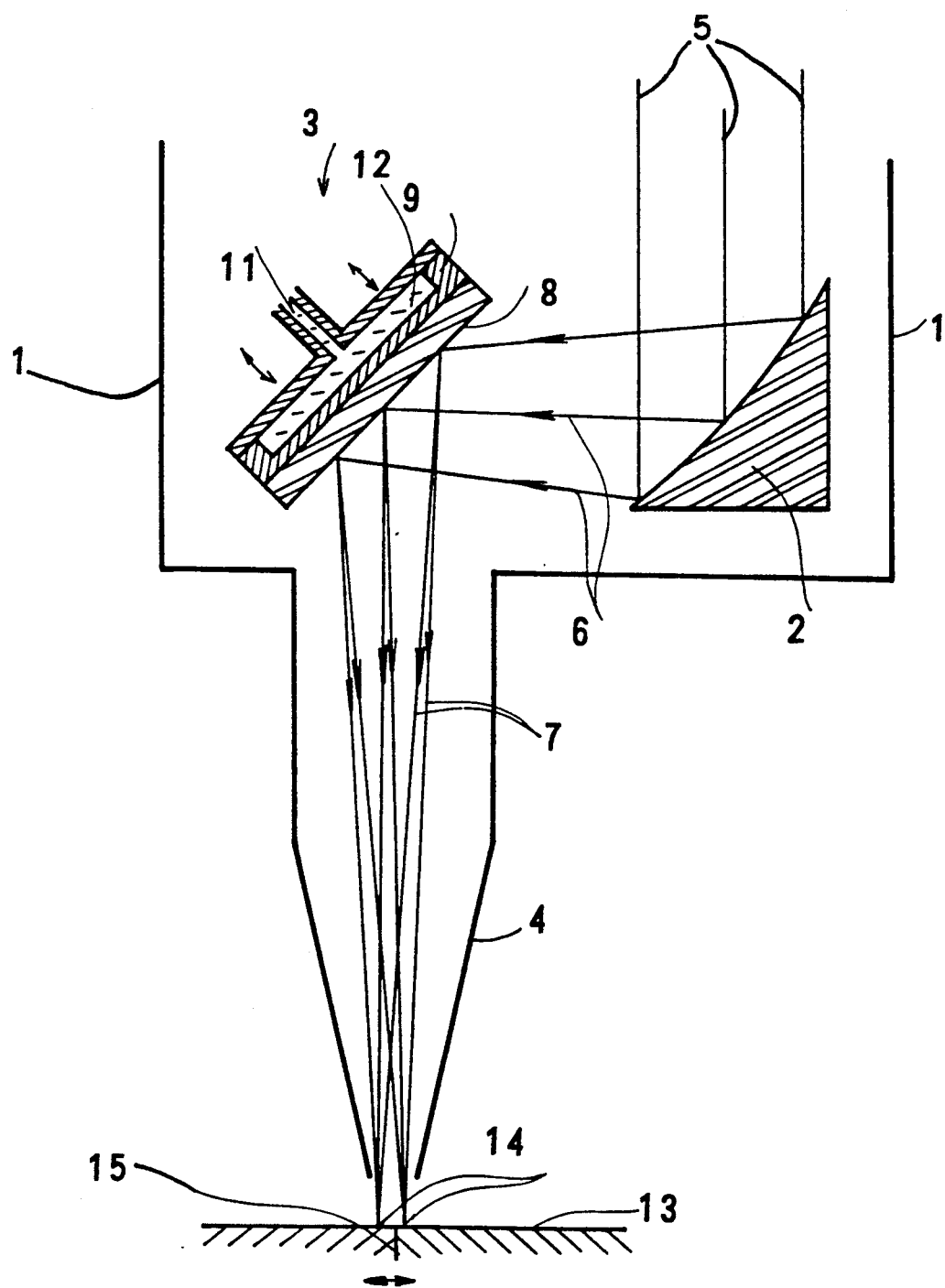
FIG. 1 is a schematic view of a laser beam scanner of this invention.

FIG. 1 shows an embodiment of this invention. A casing (1) is a receptacle for storing an optics. Although the casing (1) has a device of guiding cooling water or a device of supplying gas for laser processings, details of the casing are omitted in the figure. The optics is provided with a first, parabolic mirror (2) and a second, swaying mirror (3). The casing (1) has an opening at a point of the bottom. A torch nozzle (4) is fitted to the bottom opening. A $CO_2$ laser or a YAG laser (not shown in the figures) emits a narrow, parallel beam. An expanding optics (not shown in the figures) converts the narrow, parallel beam to a wide, parallel beam (5). Otherwise some $CO_2$ laser or YAG laser generates a wide, parallel beam. In this case, an expanding optics becomes unnecessary.

The wide, parallel beam must be converged into a spot beam on objects by some converging optics. A simple concave, spherical mirror cannot converge the wide, parallel beam on a spot because of aberration. Only a parabolic mirror can converge a wide, parallel beam on a spot. Thus, the parabolic mirror (2) is employed. The principal axis of the parabolic mirror (2) is settled to be in parallel with the axis of the incident laser beam. The parallel beam (5) is reflected by the parabolic mirror (2) to be a reflected beam (6). The optical path of the beam is bent nearly by a right angle at the parabolic mirror (2). The reflected beam (6) progresses toward the swaying mirror (3). This is a flat mirror. The beam is again reflected by the swaying mirror (3) and is focused at a point on objects (13). The point on which a converging beam (7) converges is called now an irradiation point (14). Since the swaying mirror (3) sways reciprocally in a small amplitude, the irradiation point (14) oscillates right and left across a butting line (15). This motion of the beam is called "scanning".

What drives the swaying mirror (3) is a galvanometer (not shown in FIG. 1) which is installed at a side of the swaying mirror (3). The swaying mirror (3) consists of a mirror plate (8) and a cooling plate (9) supporting the mirror plate (8). The cooling plate (9) has an inner space in which water (12) is circulating for cooling the mirror plate (8). A water terminal (11) is mounted on the rear surface of the cooling plate (9).

The converging and oscillating optics consists of the parabolic mirror (2) and the flat swaying mirror (3). As mentioned before, the axis of the parabolic mirror (2) must be parallel with the incident parallel laser beam (5). Preferably the focus of the parabolic mirror (2) reflected by the flat mirror (3) should coincide with a point on the surface of the objects (13) to be welded. However, sometimes the converging beam (7) would preferably defocus on the object surface, depending on the purpose.

Figure 2:
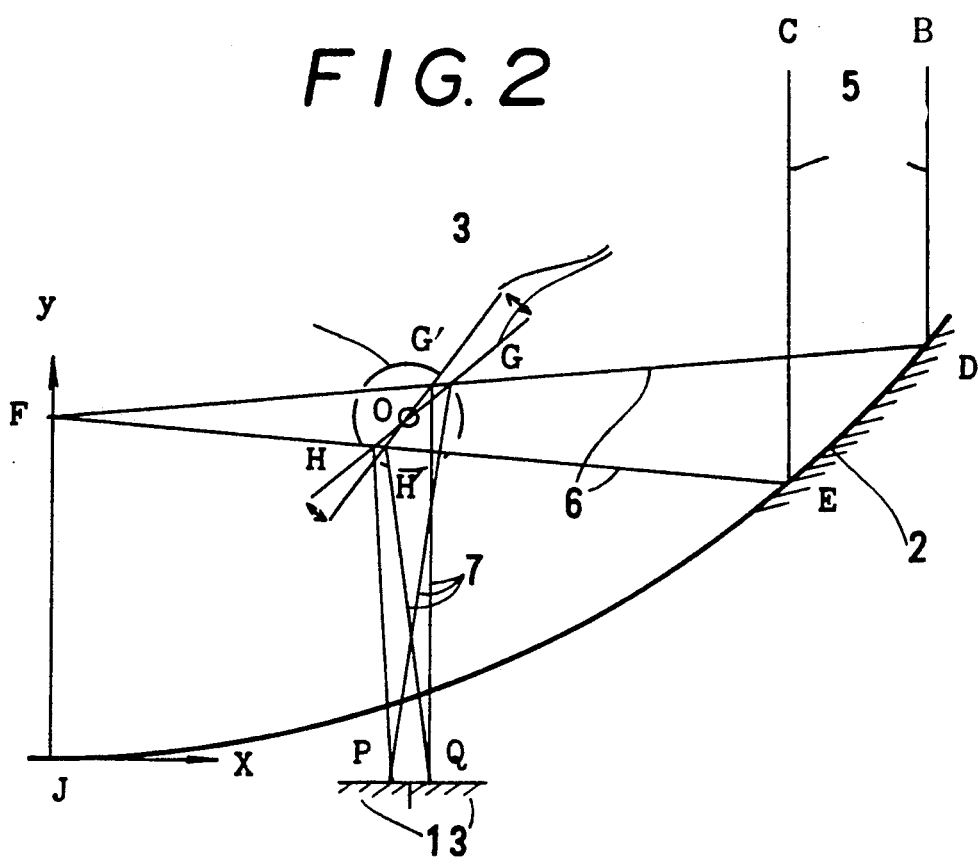
FIG. 2 is an explanatory figure showing the relation among a parabolic mirror, an axis of the mirror, a focus of the mirror, a swaying mirror and objects to be welded together.

The relation among the parabolic mirror (2), the swaying mirror (3) and the objects (13) is exhibited in FIG. 2. BC means the width of the incident, wide laser beam (5). The beam (5) attains the region DE on the parabolic mirror (2) whose principal axis is denoted as y-axis. J is an origin of the coordinate. X-axis is parallel with the surface of the objects (13). Origin J is the center of the parabola including the parabolic mirror (2) as a part. As axial lines CE and BD are parallel with y-axis (axis of the parabola), the reflected beam at the region DE would converge at a focus F which lies on y-axis. However, the swaying mirror (3) intercepts the reflected beam (6). The swaying mirror (3) is positioned at a cross point O of the reflected beam (6) with a perpendicular bisector of a segment connecting point F to a center of the object. Of course the direction of the morror (3) is also determined so as to lie along the bisector at equilibrium. The swaying mirror (3) vibrates in a small amplitude.

The swaying mirror (3) reflects the beam (6) toward the surfaces of objects (13). The doubly-reflected beam (7) converges at a point on the objects (13), e.g. P or Q. The point is a plane-symmetric counterpart of the imaginary focus F with regard to the mirror (3). When the swaying mirror (3) lies at position HG, the imaginary focus F is projected to point P. When the mirror (3) exists at position H'G', the focus F is reflected toward point Q. Thus, the vibration of the mirror (3) between GH and G'H' lets the beam scan across the butting line between P and Q. In any case the object is fed to z-direction which is perpendicular both to x-axis and y-axis.

The above is a normal disposition in which the locus of focuses coincides with the surface of objects. However, a defocus disposition is also applicable in order to adjust the power density of laser beam at the objects. In the defocus mode, the objects shall be displaced in y-direction to a pertinent height.

The mirror (3) is swayed in a small amplitude reciprocally by the galvanometer (16) between GH and G'H'. Incident points of the beam change between G and G' and between H and H'. Therefore, the image of point F varies between points P and Q.

Figure 3:
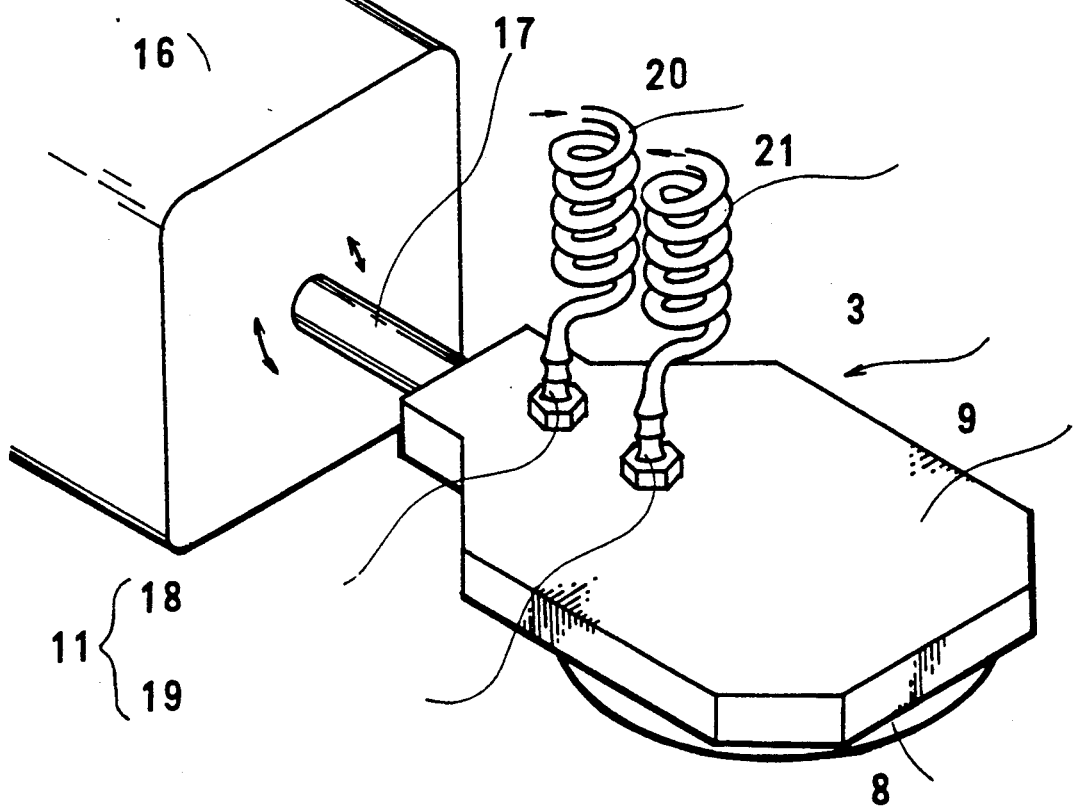
FIG. 3 is a perspective view of a swaying mirror and a galvanometer.

FIG. 3 is a perspective view of the swaying mirror (3). The swaying mirror (3) has a mirror plate (8) and a cooling plate (9). The cooling plate (9) is fitted to an output rod (17) of a galvanometer (16). The galvanometer (16) is provided with a permanent magnet, a rotor with a coil. The rotor rotates in proportion to the coil current. The galvanometer has bearings for the rotor, a shaft of the rotor and a detector of the rotation angle of the rotor besides the permanent magnet and the rotor. Application of AC current can reciprocally rotate the rotor. The amplitude and the frequency of the oscillation can arbitrarily be adjusted, depending on the purpose. A cooling water inlet (18) and outlet (19) are fitted on the rear surface of the cooling plate (9), aligning along a center, axial line on the rear surface of the cooling plate. Cooling water coiled tubes (20) and (21) are connected to the water inlet (18) and the water outlet (19).

Providing the cooling plate (9) with the parts for cooling increases the weight and inertia momentum of the mirror (3). However, this invention positions the water inlet (18) and outlet (19) on the swaying axis. Such disposition minimizes the increment of the inertia momentum as a whole. The water tubes (20) and (21) are coiled and made from elastic material. Coiling of the water tubes (20) and (21) allows them to deform easily and does not hinder the swaying action of the mirror (3). The torque T for rotating a solid body is given by T $f^2 \cdot \theta \cdot I$, where I is the secondary moment of the body, $\theta$ is the amplitude, and f is the frequency of the rotation. The secondary momentum of the swaying mirror (3) is denoted by $I_0$. Thus total secondary momentum I is represented by $I = I_0 + mk^2$, where m is the mass of the water inlet and the water outlet, and k is the deviation of the parts from the swaying axis. The positions along the center line on the rear surface give minimum deviation kW. Thus, the disposition minimizes the secondary momentum. Therefore, the driving torque for reciprocating the mirror is minimized. The positions of the water circulating parts aligning at the center line are desirable from the grounds that the mirror influences the galvanometer to a minimum and that the galvanometer influence the water circulation to a minimum.

Figure 4:
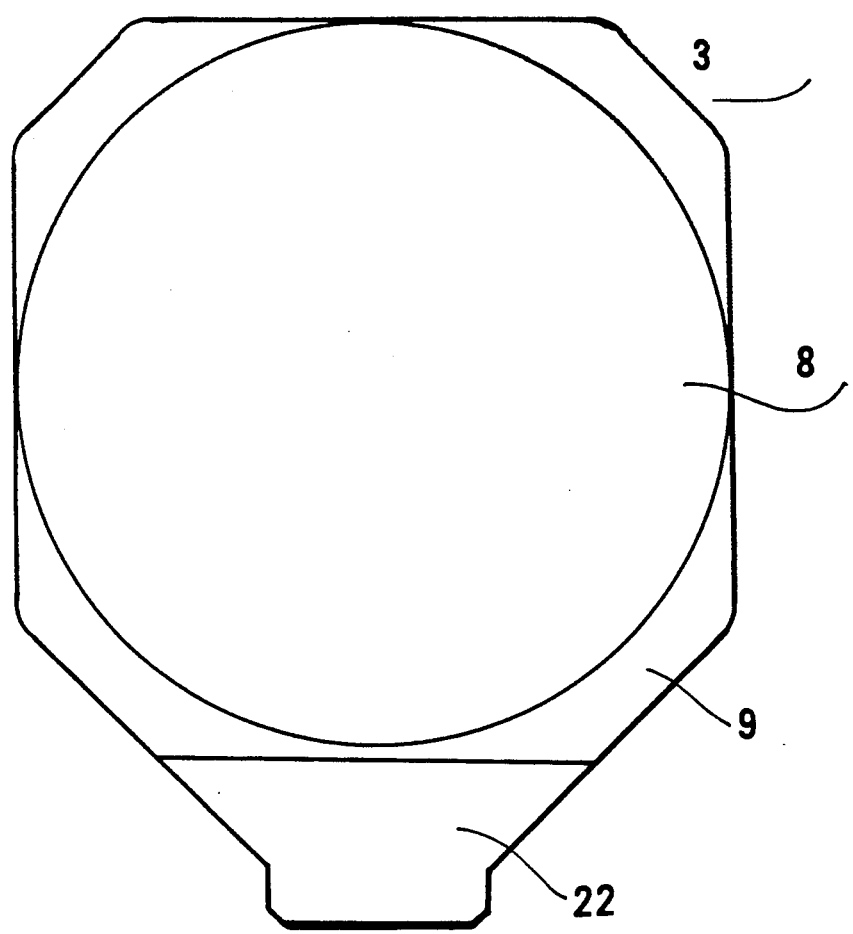
FIG. 4 is a bottom view of the swaying mirror.
Figure 5:
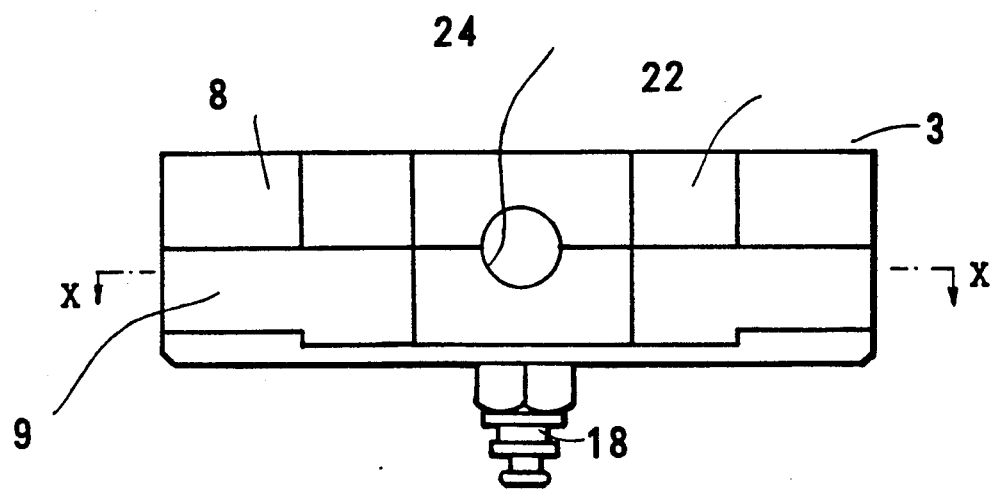
FIG. 5 is a rear view of the swaying mirror.
Figure 6:
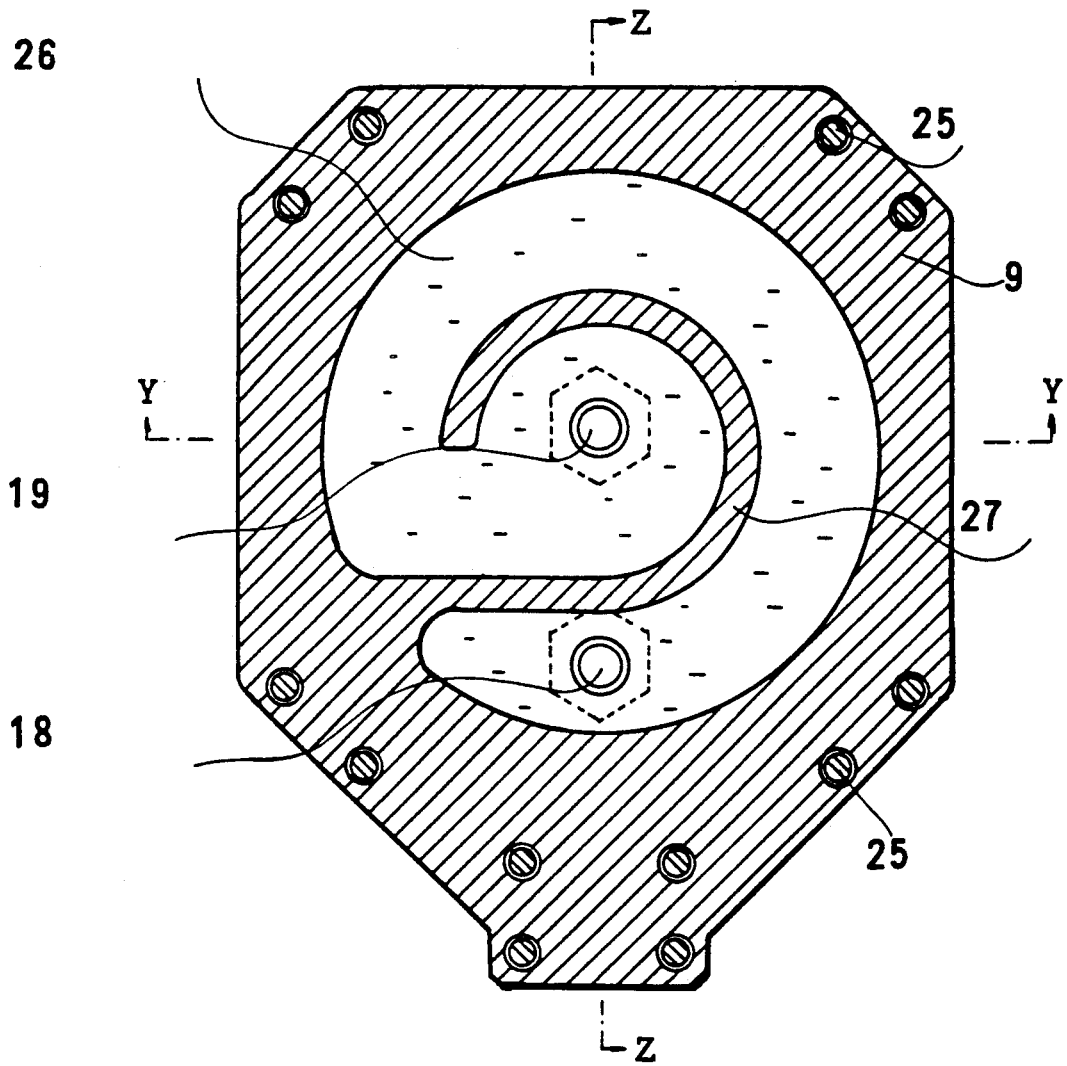
FIG. 6 is a sectional view of FIG. 5 taken along a line X—X.
Figure 7:
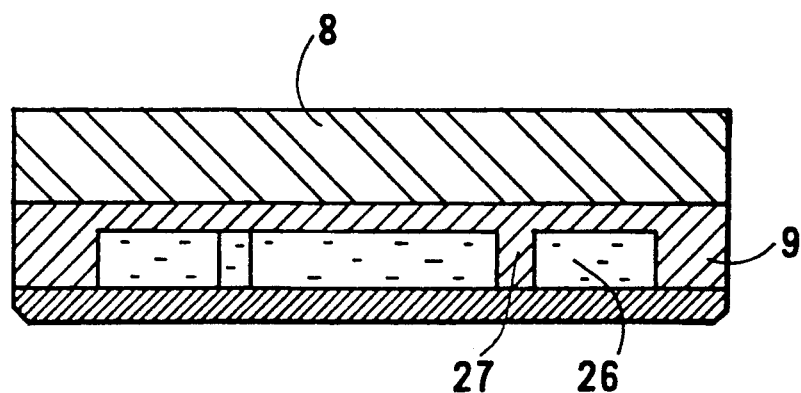
FIG. 7 is a sectional view of FIG. 6 taken along a line Y—Y.
Figure 8:
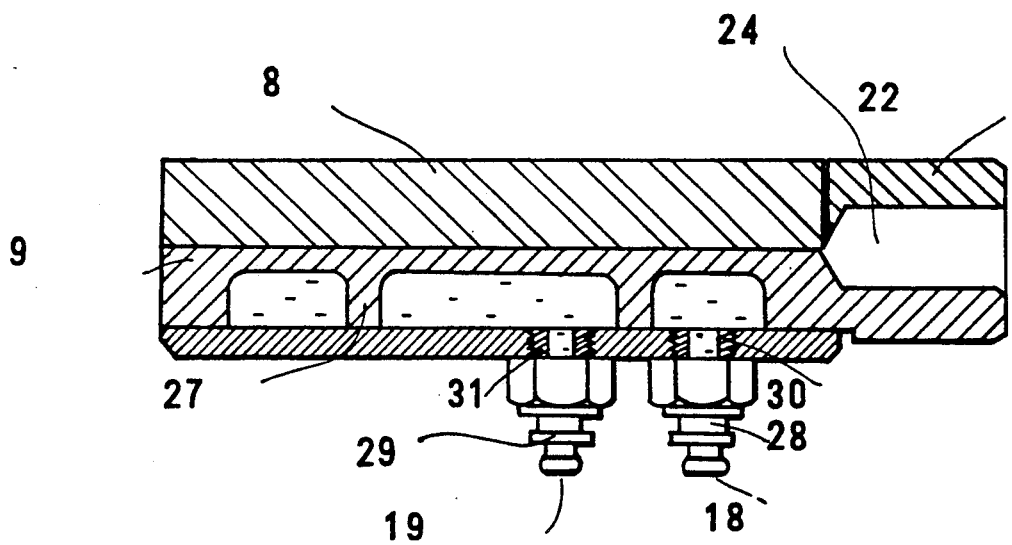
FIG. 8 is a sectional view of FIG. 6 taken along a line Z—Z.
Figure 9A:
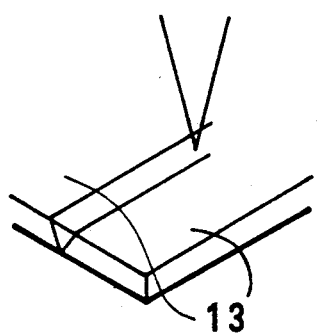
FIGS. 9(a)-9(c) are explanatory figures demonstrating movements of laser beams.
Figure 9B:
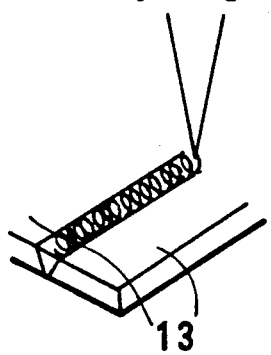
Figure 9C:
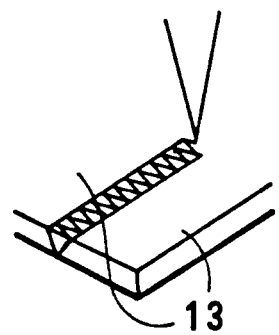
Figure 10:
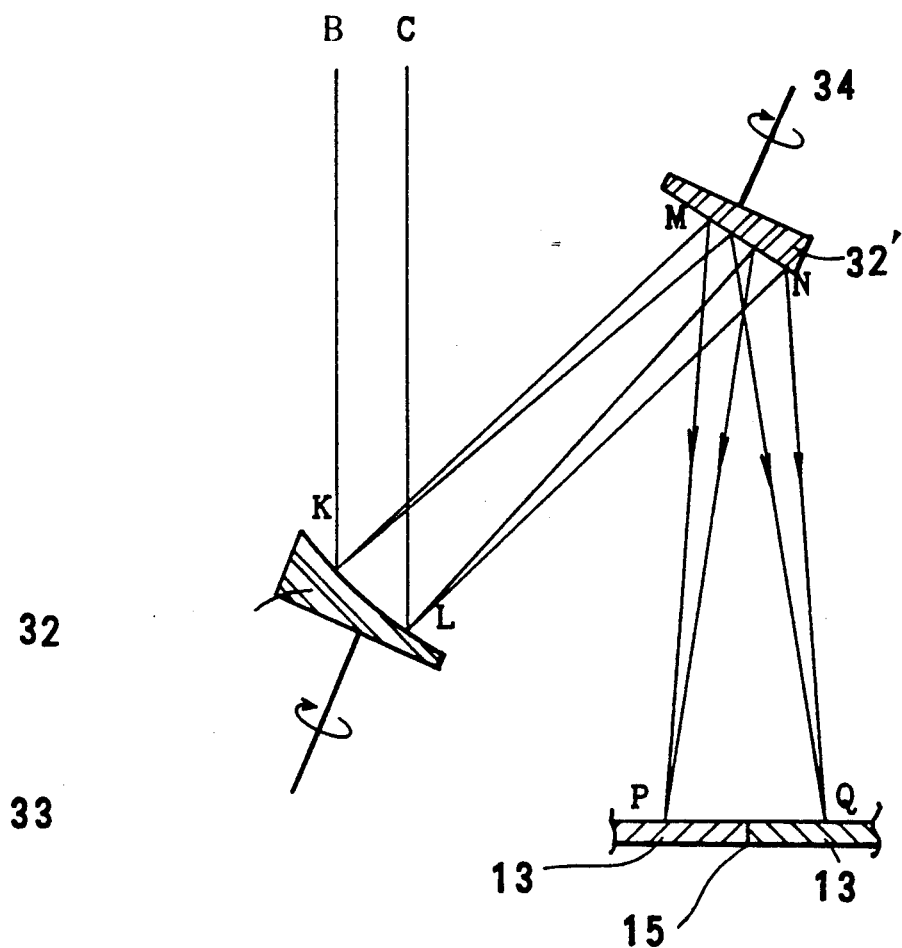
FIG. 10 is a schematic view of a prior scanner which synchronously rotates two mirrors.
Figure 11:
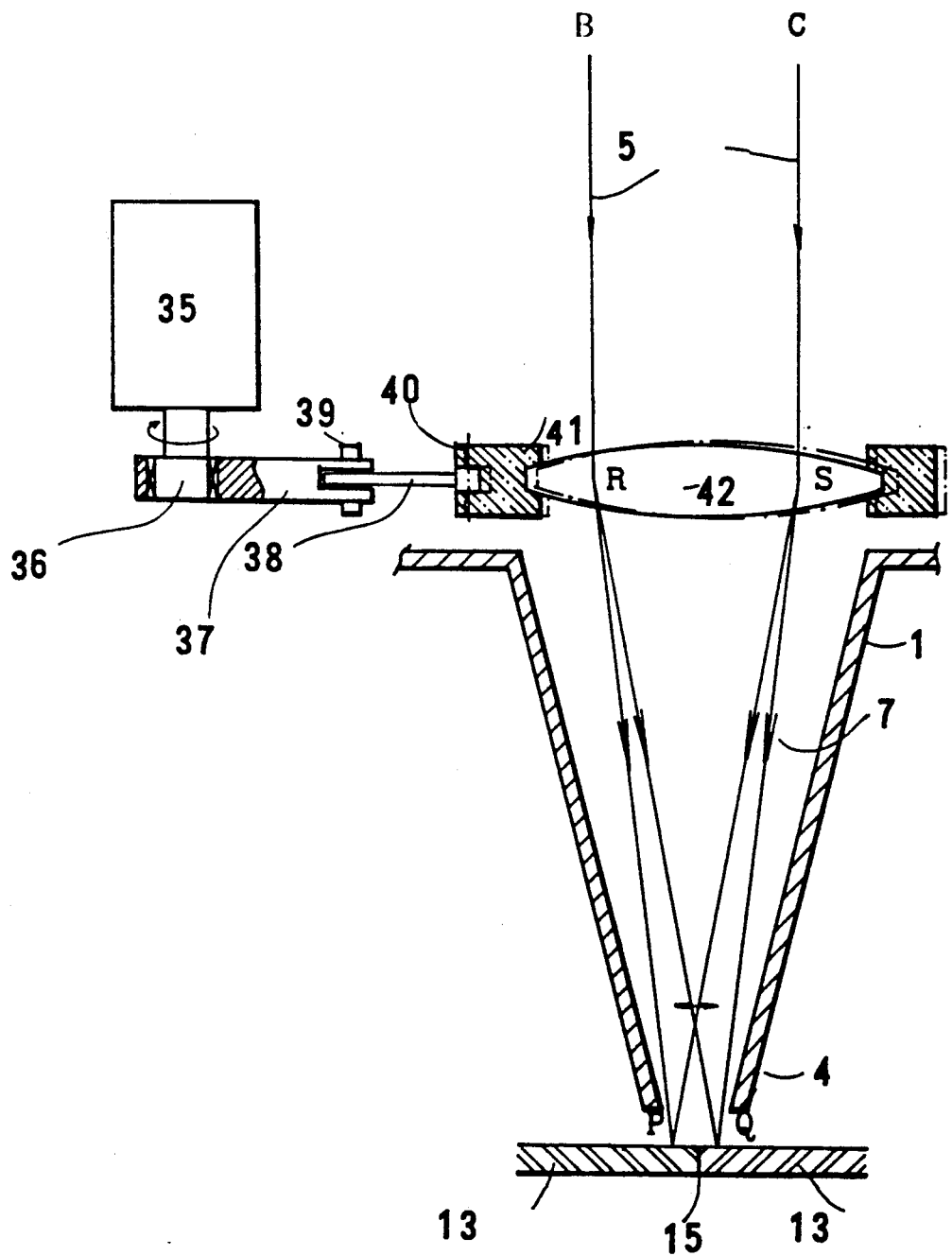
FIG. 11 is a schematic view of a prior scanner which reciprocates a lens right and left.

FIG. 4 is a bottom view of the swaying mirror. FIG. 5 is a rear view thereof. A silicon mirror plate (8) is fixed to the bottom of a cooling plate (9). Silicon is employed in order to reduce the weight of the mirror. Besides Si, beryllium (Be), aluminum (Al), copper (Cu), or molybdenum (Mo) is available for the mirror, because these materials are endowed with high reflectivity and high heat resistance. However, silicon (Si) is the most suitable for reducing the weight.

The mirror plate (8) is a plain one. The cooling plate (9) is preferably made from light metal, e.g. aluminum. A bottom plate is fixed to the bottom of the cooling plate (9). The cooling plate (9) has an inner, curling space (26) for circulation of water. The inner space (26) is a channel beginning at the water inlet (18) and terminating at the water outlet (19). A partition wall (27) curly extends from a side point to the inner space for forming the curling space. A bottom plate is welded to the main portion of the cooling plate (9).

Screws (25) fix the mirror plate (8) into the cooling plate (9). A triangle, pressing piece (22) is fitted on a forehead of the cooling plate (9). A rod-sustaining hole (24) is perforated in halves at side ends of the cooling plate (9) and the pressing piece (22). The output rod (17) is inserted into the rod-sustaining hole (24). Then the pressing piece (22) is fixed on the cooling plate (9) by screws (25).

The bottom plate of the cooling plate (9) has two screw holes (30) and (31) by which the water inlet (18) and the water outlet (19) are fixed. Water enters the inner space (26) via the water inlet (18), circulates the curling space and exhausts from the water outlet (19). Although the water does not directly cool the mirror plate (8). The water effectively cool the mirror plate (8) via a thin upper wall of the cooling plate (9).

Irradiation of laser beams on the swaying mirror produces a great amount of heat due to a little absorption coefficient. However, water circulating in the inner space (26) carries out the heat from the mirror (3). Deprivation of heat by water suppresses raising of temperature of the mirror. The heat hardly conducts via the output rod (17) to the galvanometer (16). The shafts or bearings of the galvanometer (16) is not heated. Mechanical friction does not increase, because the shaft and bearings are kept at a low temperature. Ferromagnetic material does not lose the magnetic power due to the increase of temperature, since the ferromagnetic material is not heated.

Cooling water coiled tubes should preferably be made from urethane to reduce rigidity. Urethane is a soft, elastic material. The elasticity is hardly varied according to the temperature change. Cooling of the water tubes reduces effective rigidity of the tube not to hinder the mirror from reciprocating.

An embodiment of the invention will be explained now.

$CO_2$ laser . . . 3 kW of output power, 52 mm of beam diameter

Welding materials . . . object to be welded Cold rolling steel plate
(SPCC, SGACD, SGACE, SGMCF, SPFC, etc.)

Thickness of objects . . . 1.5 mm–3 mm

Welding Mode . . . butting welding, overlapping welding, etc.

Scanning frequency . . . 10 Hz–150 Hz

Scanning amplitude . . . 0.5 mm

Speed of feeding . . . 1 m/min–10 m/min

The atmosphere of welding is not one in a laboratory of optical experiments but is the atmosphere of a general factory. Even under the factory-degree atmosphere, the experiment of welding brings about a good result. The strength of welding is satisfactory. The speed of welding (feeding speed) is also sufficient. Long-term operation hardly induces malfunction of the optics. The galvanometer and the mechanism of swaying the mirror don't fall in the operation. The reciprocal movement generates little noise or vibration.

What we claim is:

1. A laser beam scanner mounted in an apparatus for welding or annealing objects by irradiating the objects with a beam emitted from a $CO_2$ laser or a YAG laser comprising:

a parabolic mirror for reflecting and converging an incident laser beam, a swaying mirror for reflecting again the reflected beam toward the objects, a galvanometer for supporting and reciprocating the swaying mirror in a small angle, a cooling device for cooling the swaying mirror by circulating water in an inner space of the swaying mirror, the cooling device having a cooling water inlet and a cooling water outlet installed at a center line of the rear surface of the swaying mirror, and coiled tubes communicating with the cooling water inlet and the cooling water outlet for supplying water to or exhausting water from the cooling device of the swaying mirror.

2. A laser beam scanner as claimed in claim 1, wherein the swaying mirror consists of a mirror plate and a cooling plate having an inner space in which cooling water circulates.

3. A laser beam scanner as claimed in claim 2, wherein the coiled tubes are made from urethane.

4. A laser beam scanner as claimed in claim 3, wherein the mirror plate is made from silicon.

5. A laser beam scanner as claimed in claim 4, wherein the cooling plate is made from aluminum.

* * * * *